(12) United States Patent
Junuzovic et al.

(10) Patent No.: US 10,013,065 B2
(45) Date of Patent: Jul. 3, 2018

(54) TANGIBLE THREE-DIMENSIONAL LIGHT DISPLAY

(71) Applicant: Microsoft Technology Licensing, LLC, Redmond, WA (US)

(72) Inventors: Sasa Junuzovic, Kirkland, WA (US); Michel Pahud, Kirkland, WA (US); Eyal Ofek, Redmond, WA (US); Yoichi Ochiai, Tokyo (JP); Michael J. Sinclair, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 511 days.

(21) Appl. No.: 14/622,537

(22) Filed: Feb. 13, 2015

(65) Prior Publication Data
US 2016/0239092 A1    Aug. 18, 2016

(51) Int. Cl.
*G02B 6/04* (2006.01)
*G06F 3/01* (2006.01)
*G09F 9/305* (2006.01)
*G02B 6/06* (2006.01)
*G09G 5/00* (2006.01)
(Continued)

(52) U.S. Cl.
CPC .............. *G06F 3/017* (2013.01); *G02B 6/04* (2013.01); *G02B 6/06* (2013.01); *G06F 3/011* (2013.01); *G09F 9/305* (2013.01); *G09G 5/00* (2013.01); *H04N 9/3141* (2013.01); *H04N 13/0239* (2013.01); *H04N 13/0253* (2013.01); *H04N 13/0468* (2013.01); *G09G 2340/14* (2013.01); *G09G 2380/02* (2013.01)

(58) Field of Classification Search
CPC .......... G02B 6/04; G02B 6/06; G02B 26/103; G06F 3/011; G06F 3/017; G09F 9/305; G09G 2340/14; G09G 2380/02; G09G 5/00; H04N 13/0239; H04N 13/0253; H04N 13/0468; H04N 9/3141; H04N 1/19589; H04N 1/02835; H04N 1/0312; H04N 1/1205; G01N 2201/08; G01N 2201/1085
USPC .......................................... 348/51, 197, 804
See application file for complete search history.

(56) References Cited

U.S. PATENT DOCUMENTS 5,515,470 A    5/1996  Eikelmann et al.
6,587,189 B1   7/2003  Roberts et al.
(Continued)

OTHER PUBLICATIONS

Rudeck et al., Rock-Paper Fibers: Bringing Physical Affordance to Mobile Touch Devices, 2012, CHI, pp. 1929-1932.*
(Continued)

*Primary Examiner* — Christopher S Kelley
*Assistant Examiner* — Kathleen Walsh
(74) *Attorney, Agent, or Firm* — Alleman Hall Creasman & Tuttle LLP

(57) ABSTRACT

An example system includes a plurality of moveable light emitters, each moveable light emitter configured to independently emit a display light from a current display location within that moveable light emitter's range of motion responsive to activation from a corresponding light activator. The system also includes a location engine to determine, for each light emitter, the current display location of that light emitter, and a mapping engine to map, for each current display location, the light activator activating the light emitter currently located at that current display location.

20 Claims, 9 Drawing Sheets

(51) Int. Cl.
H04N 9/31 (2006.01)
H04N 13/02 (2006.01)
H04N 13/04 (2006.01)

(56) References Cited

U.S. PATENT DOCUMENTS

| | | | |
|---|---|---|---|
| 8,272,743 B2 | 9/2012 | Taylor et al. | |
| 8,749,499 B2 | 6/2014 | Ameling et al. | |
| 2004/0104935 A1 | 6/2004 | Williamson et al. | |
| 2007/0247519 A1* | 10/2007 | Riaziat | G09F 19/12 348/37 |
| 2010/0225588 A1* | 9/2010 | Newton | G06F 3/017 345/168 |
| 2012/0155816 A1* | 6/2012 | Cottrell | G02B 6/06 385/116 |
| 2012/0194511 A1* | 8/2012 | Cho | G06F 3/017 345/419 |
| 2012/0254790 A1 | 10/2012 | Colombino et al. | |
| 2013/0088462 A1* | 4/2013 | So | G06F 3/042 345/175 |
| 2013/0265285 A1* | 10/2013 | Piccolotto | G01B 11/14 345/175 |
| 2014/0125633 A1* | 5/2014 | F Hraeus | G06F 3/0421 345/175 |
| 2014/0168094 A1 | 6/2014 | Milne et al. | |
| 2015/0083917 A1* | 3/2015 | Wyrwas | G01J 1/42 250/341.1 |
| 2015/0145829 A1* | 5/2015 | Wei | G06F 3/0416 345/175 |

OTHER PUBLICATIONS

ISA European Patent Office, International Search Report and Written Opinion Issued in Application No. PCT/US2016/015495, dated Apr. 15, 2016, WIPO, 11 Pages.
Wimmer, Raphael, "FlyEye: Grasp-Sensitive Surfaces Using Optical Fiber", in Proceedings of the fourth international conference on Tangible, embedded, and embodied interaction, Jan. 24, 2010, pp. 245-248.
Bartindale, et al., "FiberSense—Multi-touch Fibre Optic Sensing on Non-Planar Surfaces", in Technical Report No. CS-TR-1175, Oct. 2009, 7 pages.
Liang, et al., "GaussBricks: Magnetic Building Blocks for Constructive Tangible Interactions on Portable Displays", in Proceedings of the SIGCHI Conference on Human Factors in Computing Systems, Apr. 26, 2014, 9 pages.
Klompmaker, et al., "DSensingNI—A Framework for Advanced Tangible Interaction using a Camera", in Proceedings of the Sixth International Conference on Tangible, Embedded and Embodied Interaction, Feb. 19, 2012, pp. 217-224.
Yu, et al., "TUIC: Enabling Tangible Interaction on Capacitive Multi-Touch Displays", in Proceedings of the SIGCHI Conference on Human Factors in Computing Systems, May 7, 2011, pp. 2995-3004.
Spindler, Martin, "Spatially Aware Tangible Display Interaction in a Tabletop Environment", in Proceedings of the ACM international conference on Interactive tabletops and surfaces, Nov. 11, 2012, pp. 277-282.
Buschel, et al., "T4—Transparent and Translucent Tangibles on Tabletops", in Proceedings of the International Working Conference on Advanced Visual Interfaces, May 27, 2014, 8 pages.
Jackson, et al., "FiberBoard Compact Multi-Touch Display Using Channeled Light", in Proceedings of the ACM International Conference on Interactive Tabletops and Surfaces, Nov. 23, 2009, pp. 25-28.
Bacim, et al., "Understanding Touch Selection Accuracy on Flat and Hemispherical Deformable Surfaces", in Proceedings of Graphics Interface, May 29, 2013, pp. 197-204.

Barnum, et al., "A Multi-Layered Display with Water Drops", in Journal of ACM Transactions on Graphics, vol. 29, Issue 4, Jul. 26, 2010, 7 pages.
Batlle, et al., "Recent Progress in Coded Structured Light as a Technique to Solve the Correspondence Problem: A Survey", in Pattern Recognition, vol. 31, No. 7, Jul. 1998, pp. 963-982.
Baudisch, et al., "Lumino: Tangible Blocks for Tabletop Computers Based on Glass Fiber Bundles", in Proceedings of the SIGCHI Conference on Human Factors in Computing Systems, Apr. 10, 2010, pp. 1165-1174.
Favalora, et al., 100-Million-Voxel Volumetric Display, in Proceedings of SPIE Cockpit Displays IX: Displays for Defense Applications, Aug. 28, 2002, 13 pages.
Gershun, A., "The Light Field", Published on: Jan. 1, 1939 Available at: http://www.amazon.com/The-light-field-A-Gershun/dp/B0008BY2Q4.
Gloge, D., "Bending Loss in Multimode Fibers with Graded and Ungraded Core Index", in Applied Optics, vol. 11, No. 11, Nov. 1972, pp. 2506-2513.
Go, et al., "Object Shape and Touch Sensing on Interactive Tables with Optical Fiber Sensors", in Proceedings of the Sixth International Conference on Tangible, Embedded and Embodied Interaction, Feb. 19, 2012, pp. 123-126.
Grossman, et al., "The design and Evaluation of Selection Techniques for 3D Volumetric Displays", in Proceedings of the 19th annual ACM symposium on User interface software and technology, Oct. 15, 2006, pp. 3-12.
Hashimoto, et al., "LightCloth: Senseable Illuminating Optical Fiber Cloth for Creating Interactive Surfaces", in Proceedings of the SIGCHI Conference on Human Factors in Computing System, Apr. 27, 2013, pp. 603-606.
Ishii, et al., "Tangible Bits: Towards Seamless Interfaces between People, Bits and Atoms", in Proceedings of the ACM SIGCHI Conference on Human factors in computing systems, Mar. 27, 1997, pp. 231-241.
Jones, et al., "An Interactive 360° Light Field Display", in the 34 International Conference and Exhibition on Computer Graphics and Interactive Techniques, Aug. 5, 2007, 4 pages.
Jones, et al., "IllumiRoom: Peripheral Projected Illusions for Interactive Experiences", in Proceedings of Conference on Human Factors in Computing Systems, Apr. 27, 2013, 10 pages.
Karnik, et al., "VORTEX: Design and Implementation of an Interactive Volumetric Display", in Extended Abstracts on Human Factors in Computing Systems, May 7, 2011, pp. 2017-2022.
Kimura, et al., "Laser Produced 3D Display in the Air", in Proceedings of ACM SIGGRAPH Emerging technologies, Jul. 30, 2006, 1 page.
Kimura, et al., "True 3D Display", in Proceedings of ACM SIGGRAPH Emerging technologies, Aug. 7, 2011, 1 page.
Levoy, et al., "Light Field Rendering", in Proceedings of the 23rd annual conference on Computer graphics and interactive techniques, Aug. 1, 1996, pp. 31-42.
Macfarlane, et al., "Voxel-Based Spatial Display", in Proceedings of Stereoscopic Displays and Virtual Reality Systems, vol. 2177, Apr. 15, 1994, 6 pages.
Matoba, et al., "SplashDisplay: Volumetric Projecting using Projectile Beads", in Proceedings of ACM SIGGRAPH Emerging Technologies, Aug. 5, 2012, 1 page.
Ochiai, et al., "Poppable Display: A display that enables popping, breaking, and tearing interactions with people", in IEEE 2nd Global Conference on Consumer Electronics, Oct. 1, 2013, 5 pages.
Ochiai, et al., "Pixie Dust: Graphics Generated by Levitated and Animated Objects in Computational Acoustic-Potential Field", in Journal of ACM Transactions on Graphics, vol. 33, Issue 4, Jul. 2014, 13 pages.
Parker, et al., Three-Dimensional Cathode-Ray Tube Displays, in Journal of the Institution of Electrical Engineers—Part III: Radio and Communication Engineering, vol. 95, Issue 37, Sep. 1948, pp. 371-387.
Plesniak, et al., "Holographic Video Display of Time-Series Volumetric Medical Data", in Proceedings of IEEE Visualization, Oct. 24, 2003, pp. 589-596.

(56) References Cited

OTHER PUBLICATIONS

Pereira, et al., "Computational Light Routing: 3D Printed Optical Fibers for Sensing and Display", in Journal of ACM Transactions on Graphics, vol. 33, Issue 3, May 2014, 13 pages.

Rudeck, et al., "Rock-Paper-Fibers: Bringing Physical Affordance to Mobile Touch Devices", in Proceedings of the SIGCHI Conference on Human Factors in Computing System, May 5, 2012, pp. 1929-1932.

Sullivan, Alan., "DepthCube Solid-State 3D Volumetric Display", in Proceedings of the Stereoscopic Displays and Virtual Reality Systems XI, vol. 5291, May 2004, 6 pages.

Takahashi, et al., An Optical Fiber Display using a 400x640 Pixel Active-Matrix LCD, in Journal of the Institute of Television Engineers of Japan, vol. 43, No. 8, Retrieved on: Nov. 11, 2014, 5 pages.

Wills, et al., "Printed Optics: 3D Printing of Embedded Optical Elements for Interactive Devices", in Proceedings of the 25th Annual ACM Symposium on User Interface Software and Technology, Oct. 7, 2013, pp. 589-598.

Sinclair, et al., "FiberTree", Retrieved on: Nov. 11, 2014 Available at: http://research.microsoft.com/en-us/projects/fibertree/default.aspx.

Jansson, et al., "A Three-Dimensional Computer Display", Computer Graphics in CAD/CAM Systems, Annual Conference, Cambridge, Apr. 1979, 5 pages.

IPEA European Patent Office, International Preliminary Report on Patentability Issued in PCT Application No. PCT/US2016/015495, Dec. 20, 2016, WIPO, 6 Pages.

\* cited by examiner

| FIBER | BASE LOCATION (X,Y,Z) | EMITTER LOCATION (X,Y,Z) | TOUCH | COLOR |
|---|---|---|---|---|
| 1 | (2,0,2) | (1,10,2) | Y | RED |
| 2 | (3,0,2) | (3,12,1) | Y | RED |
| 3 | (4,0,2) | (4,19,1) | N | WHITE |
| 4 | (5,0,2) | (6,16,1) | N | WHITE |
| 5 | (2,0,3) | (2,11,3) | Y | RED |
| 6 | (3,0,3) | (2,15,1) | Y | RED |
| 7 | (4,0,3) | (4,17,3) | N | WHITE |
| 8 | (5,0,3) | (7,18,3) | N | WHITE |
| 9 | (2,0,4) | (1,21,4) | N | WHITE |
| 10 | (3,0,4) | (3,20,4) | N | WHITE |
| 11 | (4,0,4) | (4,15,4) | N | WHITE |
| 12 | (5,0,4) | (7,21,4) | N | WHITE |
| 13 | (2,0,5) | (2,22,6) | N | WHITE |
| 14 | (3,0,5) | (3,17,6) | N | WHITE |
| 15 | (4,0,5) | (3,19,5) | N | WHITE |
| 16 | (5,0,5) | (5,20,6) | N | WHITE |

| FIBER | BASE LOCATION (X,Y,Z) | EMITTER LOCATION (X,Y,Z) | TOUCH | COLOR |
|---|---|---|---|---|
| 1 | (2,0,2) | (1,15,2) | N | WHITE |
| 2 | (3,0,2) | (3,16,1) | N | WHITE |
| 3 | (4,0,2) | (4,19,1) | N | WHITE |
| 4 | (5,0,2) | (6,16,1) | N | WHITE |
| 5 | (2,0,3) | (1,18,3) | N | WHITE |
| 6 | (3,0,3) | (2,10,3) | Y | RED |
| 7 | (4,0,3) | (4,15,3) | Y | RED |
| 8 | (5,0,3) | (7,18,3) | N | WHITE |
| 9 | (2,0,4) | (1,21,4) | N | WHITE |
| 10 | (3,0,4) | (3,17,3) | Y | RED |
| 11 | (4,0,4) | (4,13,4) | Y | RED |
| 12 | (5,0,4) | (7,21,4) | N | WHITE |
| 13 | (2,0,5) | (2,22,6) | N | WHITE |
| 14 | (3,0,5) | (3,17,6) | N | WHITE |
| 15 | (4,0,5) | (3,19,5) | N | WHITE |
| 16 | (5,0,5) | (5,20,6) | N | WHITE |

| FIBER | BASE LOCATION (X,Y,Z) | EMITTER LOCATION (X,Y,Z) | TOUCH | COLOR |
|---|---|---|---|---|
| 1 | (2,0,2) | (2,15,3) | N | WHITE |
| 2 | (3,0,2) | (4,16,2) | N | WHITE |
| 3 | (4,0,2) | (6,19,2) | N | WHITE |
| 4 | (5,0,2) | (7,16,3) | N | WHITE |
| 5 | (2,0,3) | (1,18,4) | N | WHITE |
| 6 | (3,0,3) | (3,10,4) | N | RED |
| 7 | (4,0,3) | (4,15,5) | N | RED |
| 8 | (5,0,3) | (6,18,4) | N | RED |
| 9 | (2,0,4) | (2,21,6) | N | WHITE |
| 10 | (3,0,4) | (3,17,5) | N | RED |
| 11 | (4,0,4) | (5,13,4) | N | RED |
| 12 | (5,0,4) | (7,21,4) | N | WHITE |
| 13 | (2,0,5) | (1,22,7) | N | WHITE |
| 14 | (3,0,5) | (4,17,7) | N | WHITE |
| 15 | (4,0,5) | (6,19,5) | N | RED |
| 16 | (5,0,5) | (7,20,6) | N | WHITE |

| FIBER | BASE LOCATION (X,Y,Z) | EMITTER LOCATION (X,Y,Z) | TOUCH | COLOR |
|---|---|---|---|---|
| 1 | (2,0,2) | (2,15,2) | N | WHITE |
| 2 | (3,0,2) | (4,16,2) | N | WHITE |
| 3 | (4,0,2) | (5,19,3) | N | RED |
| 4 | (5,0,2) | (7,16,3) | N | WHITE |
| 5 | (2,0,3) | (1,18,4) | N | WHITE |
| 6 | (3,0,3) | (3,10,4) | N | RED |
| 7 | (4,0,3) | (4,15,5) | N | RED |
| 8 | (5,0,3) | (7,18,5) | N | WHITE |
| 9 | (2,0,4) | (4,21,4) | N | RED |
| 10 | (3,0,4) | (3,17,6) | N | WHITE |
| 11 | (4,0,4) | (2,13,5) | N | WHITE |
| 12 | (5,0,4) | (5,21,5) | N | RED |
| 13 | (2,0,5) | (1,22,7) | N | WHITE |
| 14 | (3,0,5) | (4,15,6) | N | RED |
| 15 | (4,0,5) | (6,19,5) | N | RED |
| 16 | (5,0,5) | (6,20,5) | N | WHITE |

TANGIBLE THREE-DIMENSIONAL LIGHT DISPLAY

BACKGROUND

Some flat display devices are configured to receive touch input. Some flat display devices are configured to create the illusion of three-dimensional images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for an interactive three-dimensional display are provided. In one example, a system comprises a plurality of moveable light emitters, each moveable light emitter configured to independently emit a display light from a current display location within that moveable light emitter's range of motion responsive to activation from a corresponding light activator. The system also includes a location engine to determine, for each light emitter, the current display location of that light emitter, and a mapping engine to map, for each current display location, the light activator activating the light emitter currently located at that current display location.

DETAILED DESCRIPTION

Display devices typically display an image on a single surface, such as on the flat or curved surface of the display device. Further, while some display devices may receive touch input, such display devices are configured to only accept touch input to the front surface of the display. Thus, a user is not able to physically interact with multiple layers of the display device with current display technology.

According to embodiments disclosed herein, a display device includes individual discontinuous light-emitting elements (referred to as light emitters) that may be touched, moved, or otherwise manipulated by a user. Each light emitter may be movable in three dimensions throughout a given range of motion. In order to maintain a desired image, even as the light emitters are moving, a capture engine may be used to capture location information usable to determine the physical location in real, three-dimensional space of each light emitter. In one example, the capture engine may include a camera to capture light output by each light emitter. A location engine may use the captured location information to map the current location of each light emitter. A mapping engine may compute a mapping between the discrete light-outputting locations of the image to be displayed (e.g., pixels) and the locations of the emitters, in a way that may enable the emitters to collectively reproduce the original image (albeit in a potentially sparse fashion). Then, an image engine may use the mapping to drive the output light for each emitter. Further, user interaction with the light emitters may be tracked and the light emitters may be driven to output light based on the user interaction, and/or based on incidental physical interactions between emitters, other external forces such as wind that may move the emitters, and/or actuators that may be causing the emitters to move in a random or predetermined pattern individually, collectively, or in controlled or random subsets.

Figure 1:
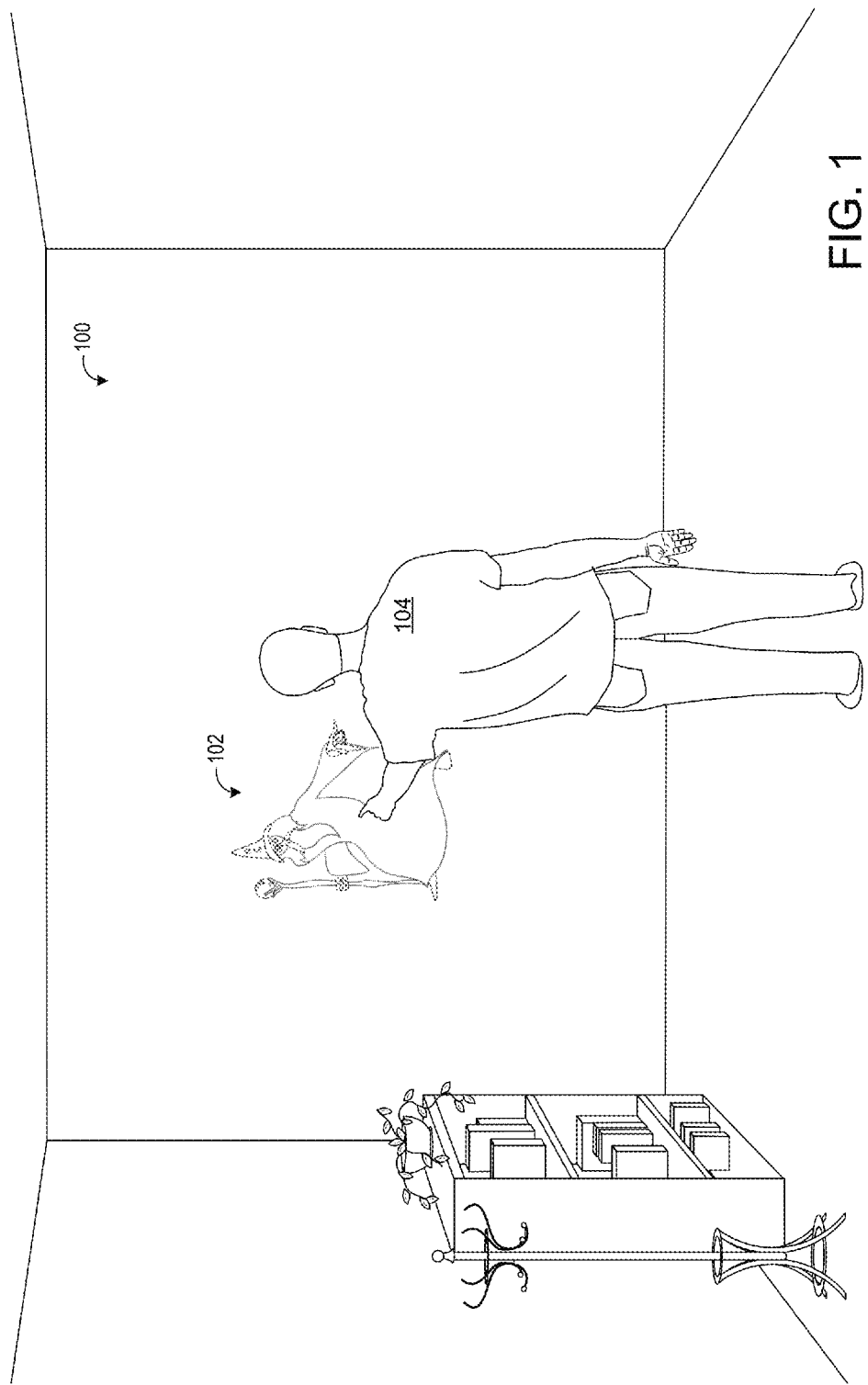
FIG. 1 shows an example environment including a three-dimensional display.

FIG. 1 shows an example environment 100 including a tangible three-dimensional display 102. As shown in FIG. 1, three-dimensional display 102 is outputting a three-dimensional image and is receiving input from a user 104. Three-dimensional display 102 may include a plurality of light emitters moveable in three dimensions. The plurality of light emitters may be tangible and create a display with high touch affordance, in that a user may experience the display through the sense of touch and may interact with the display with via touch. For example, user 104 may touch and/or move the light emitters in order to enter input to the display, expose one or more underlying layers of the display, or otherwise interact with the display. In one example, a user may perform a "dive-in" gesture in which the user reaches into the display, past some number of emitters or levels of emitters, to interact with a next set of emitters.

Figure 2:
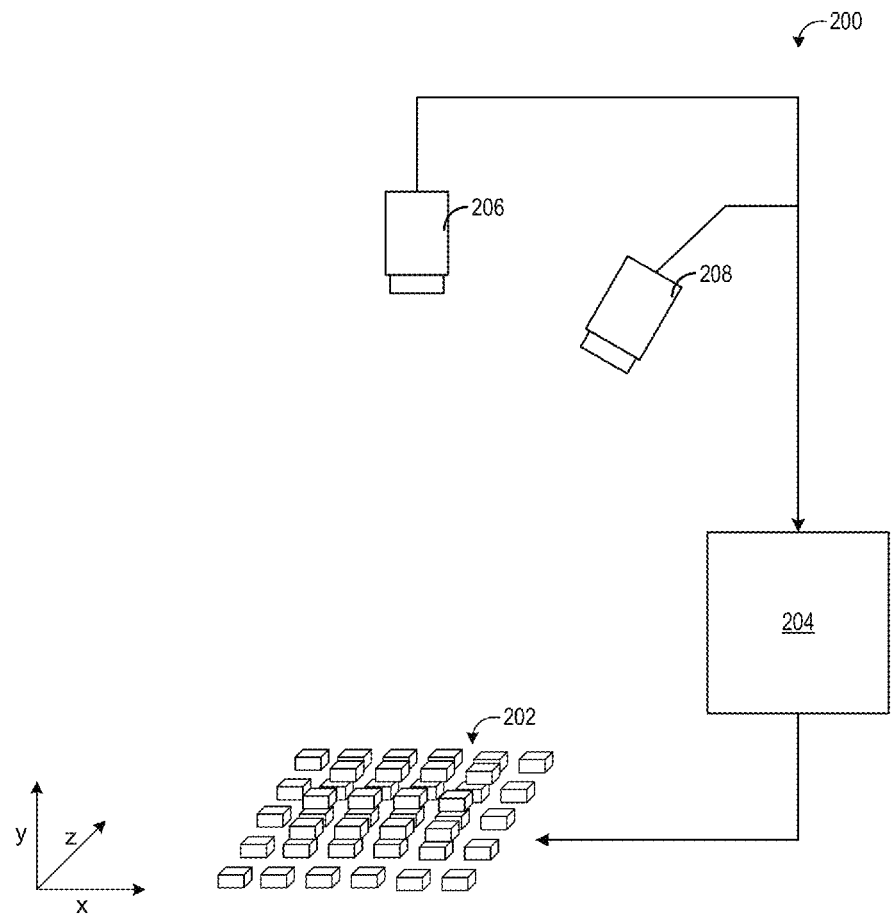
FIG. 2 schematically shows a system including an example three-dimensional display.

FIG. 2 schematically shows an example three-dimensional display 200. Three-dimensional display 200 is a non-limiting example of the three-dimensional display illustrated in FIG. 1. Three-dimensional display 200 comprises a plurality of moveable light emitters 202. Three-dimensional display 200 further includes a computing system 204 configured to drive the plurality of light emitters 202 and one or more cameras. As shown, three-dimensional display 200 includes a location-identifying camera 206 and a user tracking camera 208, one or both of which may be configured to capture image information of the light emitters 202 and send the image information to the computing system 204. While two separate cameras are illustrated in FIG. 2, in some examples one camera may be used to perform both the location-identification and tracking functions, as described in more detail below.

The plurality of moveable light emitters 202 may comprise any suitable discrete, individual moveable light emitting elements. Each of the plurality of moveable light emitters may include a light emitter optically, electrically, and/or mechanically coupled to a base (not shown in FIG. 2). In one example, the plurality of moveable light emitters may comprise a plurality of optical fibers. In other examples, the plurality of moveable light emitters may comprise light emitting diodes (LEDs) or other suitable pinpoint light element coupled to a tube, wire, or other moveable structure.

The plurality of light emitters may be uniformly and/or randomly distributed in three-dimensions. FIG. 2 includes a coordinate system with a horizontal x axis, a vertical y axis, and a lateral z axis, and the plurality of moveable light emitters 202 includes a first layer of light emitters arranged in an array across the x-z plane and a second layer of light emitters randomly distributed in the x-z plane, where the second layer of light emitters is arranged vertically above the first layer along the y-axis. However, such a configuration is merely illustrative, and virtually any arrangement of light emitters along the x, y, and z axes is within the scope of this disclosure.

In FIG. 2 and subsequent drawings, the number of light emitters and the relative position of the various light emitters is not intended to be limiting. In practice, hundreds, thousands, or even millions of different light emitters may be used in a single display. Furthermore, the relative positions of the light emitters may have any desired density. Further still, while FIG. 2 shows only a minor variation in the x, y, and z dimensions, the light emitters may be structured with any desired relative depth, width, and/or length.

As described above, the plurality of moveable light emitters may be coupled to a base structure such that each base end of each moveable light emitter has a fixed location. Each light-emitting end of each moveable light emitter may be moveable in three-dimensions throughout a range of motion. For example, each light-emitting end may be flexibly coupled to the base structure via a flexible fiber, wire, tubing, or other structure, and have a range of motion constrained by the physical structure of the light emitter, base, and intervening coupling mechanism, as well as constraints imposed by adjacent light emitters.

Each light-emitting end may have a suitable shape. For example, each light emitting end may be flat, a half-sphere, circular, rectangular, or other suitable shape. In some examples, the shape and polishing and/or texture of the light-emitting end may impact the perceived resolution, angle view of the display, or other factors, and thus may be selected based on desired display configurations.

The plurality of moveable light emitters are configured to output display light responsive to activation by a corresponding light activator. In some implementations, a plurality of light activators may be used. For example, there may be one light activator for every light emitter. In other implementations, there may be two or more light activators for every light emitter. In still other implementations, a single light activator may be responsible for activating two or more different light emitters. When a single light activator activates two or more different light emitters, the light activator may activate the different light emitters so as to output the same display light or different display light. As an example of different display light, a light activator in the form of a laser may be aimed towards different light-receiving ends of optical fibers at different times in order to cause the light-emitting ends of the fiber optic strands to emit a desired display light at different times.

The light activator(s) may activate the light emitters according to instructions stored on and executed by computing system 204. In one example, the light activator(s) may comprise a plurality of light suppliers. For example, in configurations where the light emitters comprise optical fibers, the display light may be provided via a laser projector, LED or LCD display, or other light supplying device configured to project light onto the base ends of the optical fibers. Due to the base ends of the optical fibers receiving light, the base ends of the optical fibers are also referred to as light-receiving ends. The optical fibers may guide the received light to light-emitting ends opposite the light-receiving ends. The plurality of light suppliers may be controlled by computing system 204 such that a desired image is displayed via the light-emitting ends of the optical fibers.

In another example, such as in configurations where the light emitters comprise LEDs, the light activator(s) may comprise wires configured to send electrical signals and/or commands to activate the respective LEDs. In this way, each LED may be selectively activated by computing system 204 to output a desired image. Such selective activation may include selectively turning each LED on or off, selecting a display light color for each activated LED from among a plurality of colors, and/or selecting an intensity of light output by each LED.

Figures 7A, 7B:
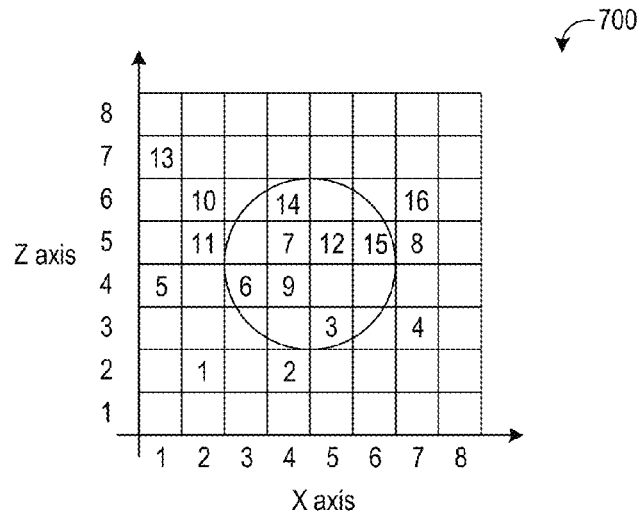

As discussed previously, each light emitter is moveable in three dimensions. Thus, while each light emitter may receive light at a fixed location, each light emitter may emit light at a plurality of different locations within a range of motion for that light emitter. Accordingly, if the various light emitters are supplied with light to form an image, the perceived image output by the light emitters will change as the light emitters move if the supply light is not changed to compensate for the emitter movement. To avoid such issues, the location of each light emitter may be determined based on image information captured from location-identifying camera 206, the details of which will be discussed below with respect to FIG. 7. Briefly, each light emitter may be activated by a corresponding light activator (driven by the computing system 204) to output a uniquely-identifying location light that is captured by location-identifying camera 206. The image information from location-identifying camera 206 is sent to the computing system 204, where it is used to determine the current location of each light emitter. The location light output by the light emitters may include visible or infrared light output in a plurality of different frequencies, according to a set of time sequential binary patterns, or other suitable light usable to uniquely identify the location of each light emitter. Further, as explained in more detail below, other mechanisms may be possible for determining the location of each light emitter, such as individually tracking the location of each fiber in three dimensions with one or more depth sensors.

Three-dimensional display 200 is also configured to recognize touch input from a user's finger(s), an object such as a pen, or any other suitable touch implement. In one example, in order to detect a position of the touch implement in three dimensions, user tracking camera 208 may capture image information usable by computing system 204 to track a position of the touch implement relative to the light emitters. For example, the tracking camera may be a depth camera configured to acquire depth information and send the depth information to the computing system 204. Based on the depth information, the position and/or orientation and/or shape of the touch implement may be determined. When the touch implement is determined to be within a threshold distance of one or more light emitters (e.g., in contact with), a suitable action may be taken by the computing system 204, such as adjusting the light output by one or more light emitters (for example, to provide a visual indicator of the touch location), selecting a graphical user interface object displayed via the three-dimensional display 200, or other suitable action.

In order to control the above-described functions, the computing system 204 may include a capture engine to capture light-emitter location information (e.g., a camera to capture light emitted by the light emitters) and a location engine to determine, for each light emitter, the current display location of that light emitter. Computing system 204 may further include a mapping engine to map, for each current display location, the light activator activating the light emitter currently located at that current display location. Additionally, computing system 204 may include an image engine to drive the plurality of light emitters to display a target three-dimensional image based on the mapping. Additional details regarding computing system 204 will be provided below with respect to FIG. 9.

Thus, as described above, a tangible three-dimensional display device may include a plurality of light emitters that are moveable in three dimensions. The light emitters may comprise optical fibers in one example, and the location of each light-emitting end of each optical fiber may be determined according to image information captured by a camera. Further, as the location of each light-emitting end of each optical fiber changes, the display light provided to each optical fiber may be adjusted in order to maintain a consistent output of a desired image.

Figure 3A:
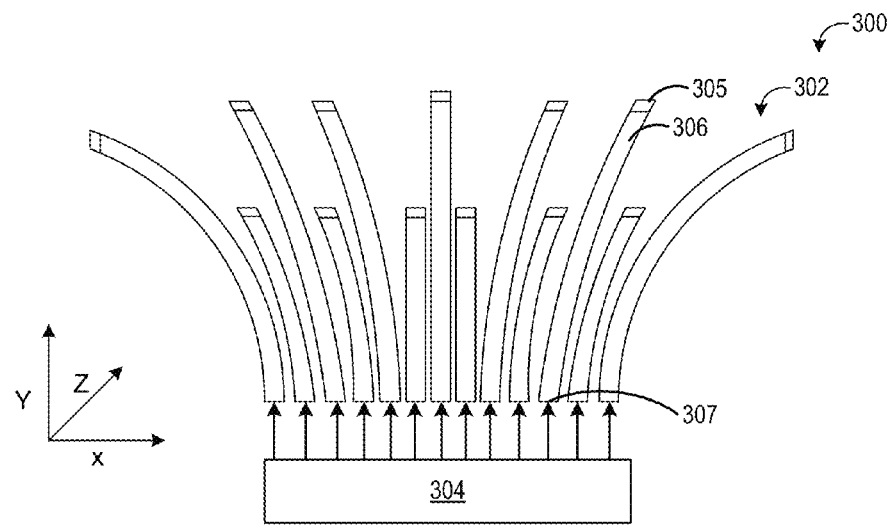
FIGS. 3A and 3B schematically show cross-sectional partial views of an example three-dimensional display.
Figure 3B:
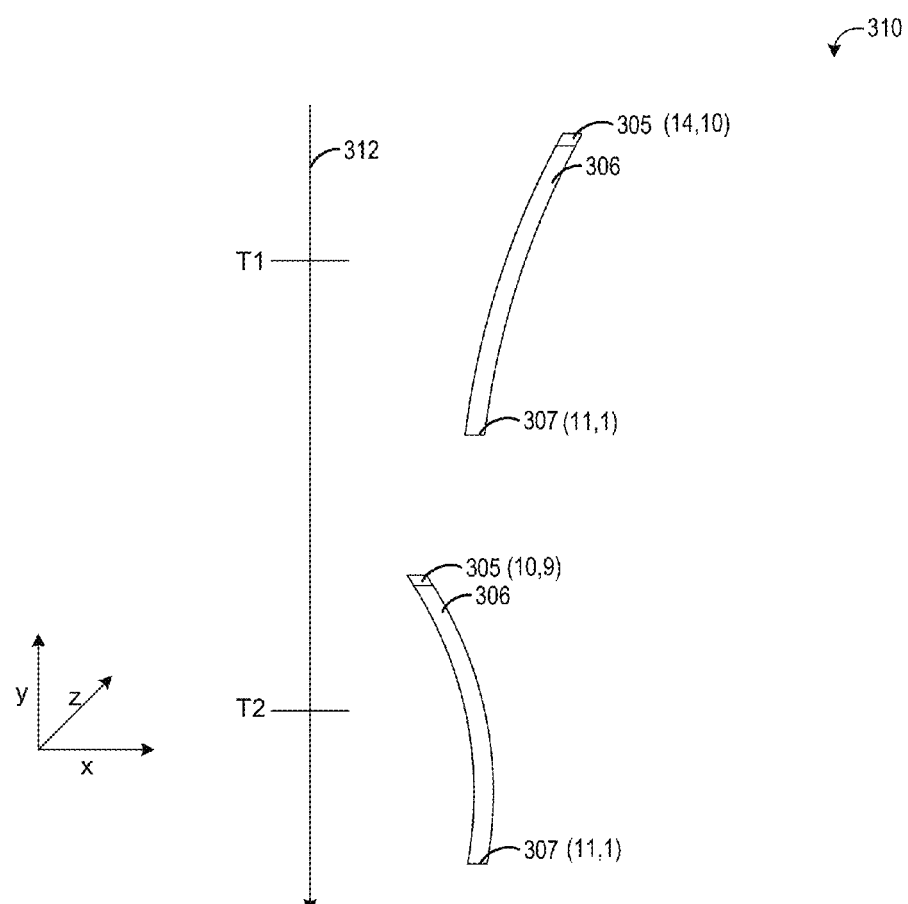

FIGS. 3A and 3B illustrate a cross-sectional partial view of an example three-dimensional display 300 comprising a plurality of optical fibers 302. In FIG. 3A, only thirteen fibers are illustrated. However, a display may include hundreds, thousands, or even millions of such fibers. Each optical fiber, such as representative optical fiber 306, includes a light-receiving first end 307 and a light-emitting second end 305. The plurality of optical fibers 302 are optically coupled to a display light source 304, such as a laser projector including one or more pixel light activators for every optical fiber. The display light source 304 may project display light to each of the optical fibers in a suitable configuration. For example, each pixel of the display light source may be configured to supply light to one or more optical fibers, while in other configurations each optical fiber may be supplied light from two or more pixels of the display light source. In further examples, the optical fibers may be sparsely distributed across the display light source such that some of the pixels of the display light source do not supply light to any optical fibers. In still further examples, the display light source may not be pixelated, and each fiber may receive light from a discrete light producer.

The plurality of optical fibers may be of uniform length, or as illustrated, have a plurality of different lengths. In the example illustrated in FIG. 3A, the optical fibers comprise two different lengths in order to form two layers of light-emitting ends. A display may be configured with any number of discrete layers, or the fibers may have random or pseudorandom lengths to form a more even distribution of different lengths. In one non-limiting example, each optical fiber may have a length in a range of 5-25 cm and a thickness of approximately 0.25 mm. By providing relatively long fibers, a user may be able to reach into the display and fully manipulate the fibers. Further, the optical fibers may be rigid and thus have little or no curvature, or the optical fibers may be flexible and configured to bend. Any degree of rigidity from very rigid to very flexible is within the scope of this disclosure. As shown, the optical fibers are flexible and bend randomly according to the length, weight, and rigidity of the optical fibers and the proximity of other optical fibers.

The optical fibers may be optically coupled to the display light source 304 in a suitable arrangement, such as in a grid, in one or more bundles, and/or randomly. In an example, a display may include a first region and/or group of layers with different lengths of fibers randomly distributed, and include a second region and/or group of layers with N discrete lengths of fibers. In one example, the three-dimensional display 300 may comprise approximately 5,000-10,000 optical fibers. By arranging the optical fibers in one or more bundles, a compromise between construction and calibration may be made, such as using separate bundles for each layer to simplify calibration.

As discussed above, the optical fibers are moveable in three dimensions relative to a fixed location (e.g., the light-receiving first ends of each optical fiber may be held in a fixed location). Thus, each light-emitting end of each optical fiber may move horizontally (e.g., along the x-axis), vertically (e.g., along the y-axis), and front and back (e.g., along the z-axis) within a range of motion.

This moveability is illustrated in FIG. 3B, which is a diagram 310 illustrating a timeline 312 of a position of the light-emitting second end 305 of optical fiber 306 at two time points, T1 and T2. At time T1, the optical fiber is in a first position. In the first position, the light-receiving first end 307 is in its fixed position, illustrated herein as having an (x, y) position of (11, 1), while the light-emitting second end 305 is in a first (x, y) display location of (14, 10). At time T2, the optical fiber has moved, due to a user touching the optical fiber, for example. As such, while the light-receiving first end 307 remains fixed at (11, 1), the light-emitting second end 305 has moved to (10, 9). It is to be understood that due to the cross-sectional, two-dimensional illustration of the three-dimensional display, the position of the optical fiber 306 in the z direction is not illustrated, but the light-emitting end of the optical fiber may have a different location along the z-axis in addition to moving along the x and y axes.

Thus, the three-dimensional display may comprise a plurality of moveable light emitters that each may have a fixed location at one end and a moveable location at an opposite, light-emitting end. The light emitters may move in response to a user touch input and/or touch with an object(s) such as a pen, and/or any other suitable touch implement(s), and/or other external forces, such as air movement or an actuator or set of actuators external to the display or built into the display. When a user touches one or more of the light emitters, a suitable action may be performed, such as an associated audio or haptic feedback. In another example, the light emitters receiving the touch input may be configured to light up and/or change in color and/or intensity of light output relative to other light emitters.

Figures 4A, 4B:
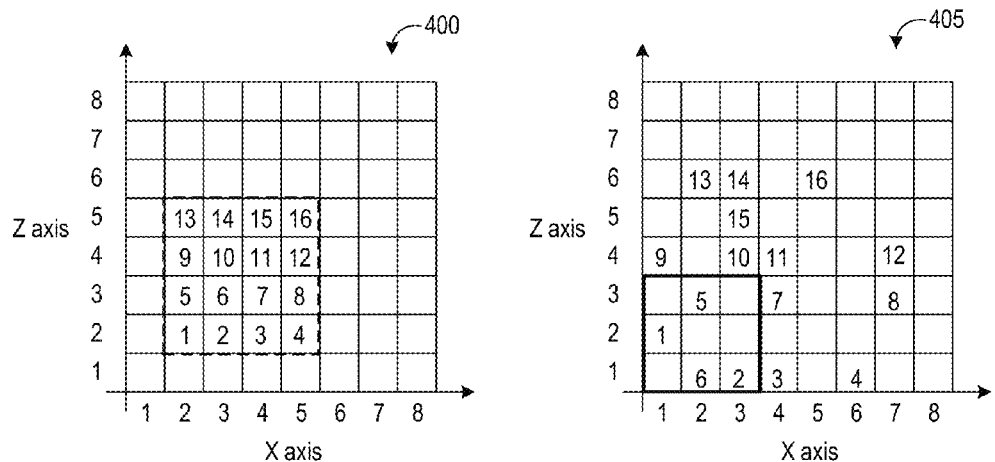
FIGS. 4A, 4B, 5A, 5B, 6A, 6B, 7A, and 7B are example fiber grids and corresponding tables illustrating positions of a plurality of light emitters of a three-dimensional display.

An example base configuration and movement of a plurality of light emitters is illustrated in FIGS. 4A, 4B, 5A, 5B, 6A, 6B, 7A, and 7B. Referring first to FIG. 4A, grids 400 and 405 depict a grid of optical fibers at different representative cross-sections in the y-plane. Grid 400 illustrates the location of a plurality of optical fibers in the x-z plane at a y-value of zero. As such, grid 400 represents the light-receiving end location of a plurality of optical fibers, where the optical fibers include 16 representative fibers arranged in a 4×4 grid. These 16 fibers may be part of a larger display. For purposes of illustration, the grid of 16 optical fibers originates at an (x, y, z) coordinate location of (2, 0, 2) and extends outward along the x and z axes with the height of the optical fibers extending along the y axis, however, it is to be understood that any locations for the optical fibers are possible. Each fiber has a fixed light-receiving (x, y, z) location and a moveable light-emitting end (x, y, z) location.

Grid 405 shows the light-emitting end locations of the 16 optical fibers in cross-section at a suitable y-plane value that is greater than zero, such as 15. The relative location of each light-emitting end is representative and it is to be understood that each light-emitting end may not be located on the same y-plane. Grid 405 illustrates that while each optical fiber may have a light-receiving end location within the grid, each light-emitting end may be located in a different location than its respective light-receiving end location. Further, a touch input is being applied to the optical fibers, represented by the solid box overlaying the grid. The 16 optical fiber light-emitting ends are distributed throughout three-dimensional space, and while not illustrated in FIG. 4A, other fibers may also be present in the same three-dimensional space.

FIG. 4B is a table 410 illustrating example light-receiving end (x, y, z) location and light-emitting end (x, y, z) locations for the 16 fibers, as well as whether the fibers are receiving a touch input and the color being emitted by each respective emitter. The dimensions of these locations may be any suitable measurement unit. As one example, the dimension of the (x, y, z) base locations may be millimeters, and the dimension of the (x, y, z) emitter locations may be centimeters. The example values presented in table 410, as well as the tables described below, is not intended to be limiting. For example, the absolute dimensions of the x, y, and z components, as well as the dimensions of the x, y, and z components relative to one another may be substantially different than the presented examples. For example, the absolute y dimension of the light-emitting ends may be substantially greater than the absolute x and z dimensions and/or the relative change in the y dimension may be substantially less than the relative change in either the x or the z dimension.

As shown in table 410, a touch input is applied to fibers 1, 2, 5, and 6. Responsive to this touch, each of the touched fibers outputs a different color (e.g., red) than the remaining fibers (which output white light, for example).

Figures 5A, 5B:
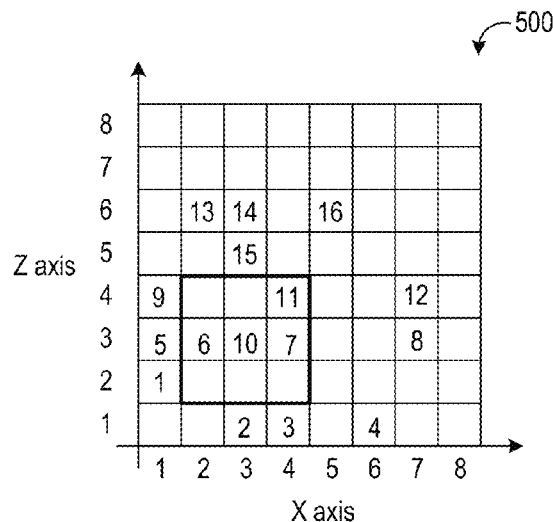

FIGS. 5A and 5B show a grid 500 and a table 510 illustrating how the light-emitting end locations of the optical fibers change in response to the touch input moving to a different location. The light-receiving end location for each of the optical fibers remains the same, while at least for a subset of the optical fibers, the light-emitting end locations have changed. The touch input is being applied to fibers 6, 7, 10, and 11, and as such the light-emitting end location for fibers 6, 7, and 10 have changed. For example, the light-emitting end location for fiber 7 has moved from a first location of (4, 17, 3) to a second location of (4, 15, 3) due to the touch input exerting a downward force on the optical fiber, for example. The light-emitting end location for fiber 6 has moved from a first location of (2, 15, 1) to a second location of (2, 10, 3). Further, fibers 6, 7, 10, and 11 are emitting red light, while fibers 1, 2, and 5 have resumed emitting white light. Additionally, while the above example includes the fibers moving due to direct touch input, in some examples fibers may move as a result of movement of neighboring fibers.

FIGS. 6A 6B, 7A, and 7B depict a first table 610 and a second table 710 showing light-receiving end and light-emitting end locations of the 16 fibers arranged in the 4×4 grid, where at least some of the fibers change location due to an external force. In the example scenario represented by tables 610 and 710, an image is being displayed by the three-dimensional display, which includes a circle of red light positioned in the region of the display comprising the 16 fibers.

Figures 6A, 6B:
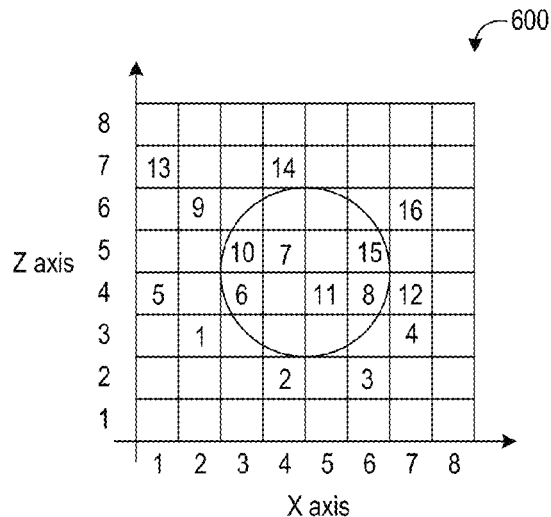

As shown by grid 600 and table 610 of FIGS. 6A and 6B, respectively, during a first point in time, the circle of red light includes fibers 6, 7, 8, 10, 11, and 15, while all the remaining fibers are located outside the circle of red light.

Fibers 6, 7, 8, 10, 11, and 15 are positioned such that their light-emitting ends are arranged in the circle, and thus the fibers are supplied with red light to output the image of the circle. It is appreciated that the 16 numbered fibers are exemplary and non-limiting, and that other fibers not illustrated in FIG. 6A may also be present, both within the circle and outside of the circle.

As the fibers change position, to maintain consistent display of the red circle in the same position, the supply of display light changes. As shown in grid 700 and table 710 of FIGS. 7A and 7B, respectively, at least some of the fibers have changed position at a second point in time. Accordingly, the light-emitting ends of fibers 3, 6, 7, 9, 12, 14, and 15 are now located within the red circle. As such, fibers 8, 10, and 11 have moved out of the circle while fibers 3, 9, 12, and 14 have moved into the circle. The mapping of the light emitters to respective locations in three-dimensional space of the display is updated, and as a result fibers 3, 9, 12, and 14 are adjusted to output red light, and fibers 8, 10, and 11 are adjusted to output white light. In this manner, the image of the red circle may remain consistent, even as the fibers move. Further, the circle of red light illustrated in FIG. 7A has a larger number of light-emitting ends than the circle of red light illustrated in FIG. 6A. In other examples, the circle of red light illustrated in FIG. 7A may have an equal or smaller number of light-emitting ends than the circle of red light illustrated in FIG. 6A.

Figure 8:
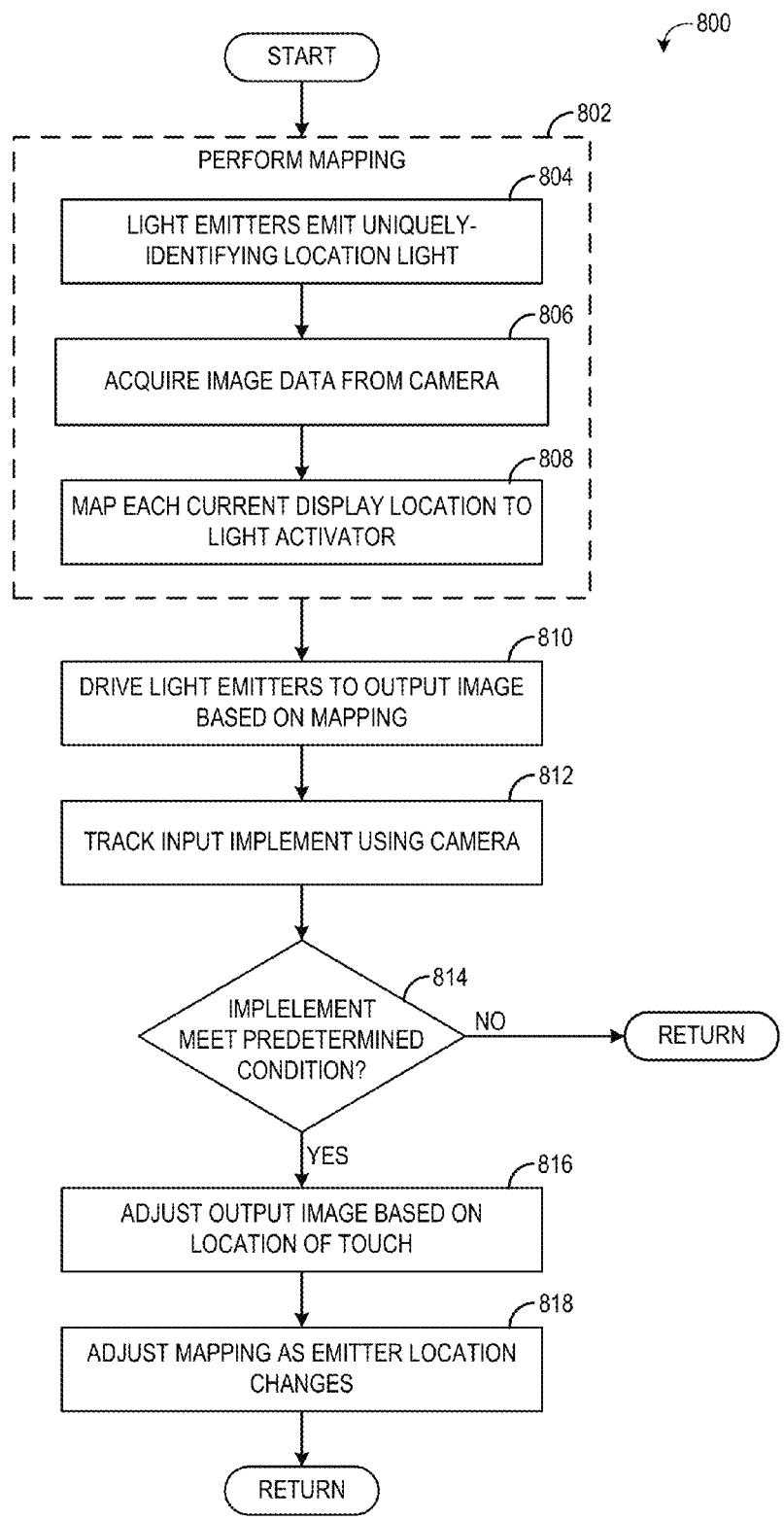
FIG. 8 is a flow chart illustrating a method for outputting an image via a three-dimensional display.

Turning now to FIG. 8, a method 800 for outputting an image on a tangible, three-dimensional display, such as three-dimensional display 102 of FIG. 1, three-dimensional display 200 of FIG. 2, or display 300 of FIG. 3A is illustrated. Method 800 may be carried out according to instructions stored on and executed by a computing system, such as computing system 204 of FIG. 2 and/or computing system 900 of FIG. 9, described below. Method 800, or subparts thereof, may be continuously looped such that a desired image may be maintained as light emitters move, as a user interacts with the display, and/or as the input image changes (e.g., sequence of frames from a video).

At 802, method 800 includes performing a mapping routine in order to map each current display light-emitting location to a respective light activator and/or light emitter. Each of the plurality of light emitters comprising the display is moveable in three-dimensions, and thus at any given point in time may occupy any of a plurality of different locations. To determine where each light emitter is located (relative to each light emitter's respective base location, which may also include the location of each respective light activator), a mapping routine is performed.

The light emitters may move due to one or more factors. The factors may include, but are not limited to, physical touch by a user or touch implement, the light emitters pushing against each other, other external forces, such as wind, building vibration, change in temperature, magnetism (e.g., the emitters may have a metallic coat), and/or actuators in the display itself that either cause the entire display, subsets of light emitters, or individual emitters to vibrate, oscillate, move, shake, etc.

The mapping routine includes, at 804, driving each light activator to activate a corresponding light emitter to emit a uniquely-identifying location light. The computing system may drive each light activator to activate the corresponding light emitter to emit the location light by outputting a desired image or series of images to be projected by a plurality of light suppliers (e.g., laser projector), or the computing system may directly instruct the light emitters to emit the location light.

The location light emitted by the light emitters is observable by a camera. In one example, the location light emitted by the light emitters may be visible light, and thus the mapping routine may be carried out prior to display of a desired image. Such a routine assumes that the light emitter location will not change once the mapping routine is performed, and thus may not be accurate over time. As such, in some examples the location light emitted by the light emitters may include infrared or other non-visible light, enabling the mapping routine to be carried out even when images are displayed by the three-dimensional display device. In still further examples, the location light may be the display light output by the light emitters during display of a desired image. Additionally or alternatively, instead of determining the location of each light emitter based on light emitted by the light emitters, various sensors may be used to determine the location of each light emitter, such as depth sensors, motion sensors, etc.

The location light may be uniquely-identifying due to the computing system's ability to associate various aspects of the location light output by each light emitter with that light emitter. For example, each light emitter may be driven to output a relatively unique frequency of light (e.g., relatively unique such that only one light emitter emits a given frequency of light, or relatively unique such that only a given light emitter within a certain region of the display emits a given light frequency). In another example, each light emitter may be driven to output a unique or relatively unique binary light pattern. For example, each light emitter may be driven to be turned on and off over a period of time in a unique pattern.

At 806, image data is acquired from a camera. The camera may be a visible light and/or infrared light camera, and optionally may be positioned relative to the display to capture light at approximately the same angle as a user would view the display. In some examples, more than one camera may be present at different locations to avoid occlusion issues. For example, the camera may be the location-identifying camera 206 of FIG. 2. The image data captured by the camera is sent to the computing system. Based on the image data, each current display location is mapped to a light activator, as indicated at 808. As described above, this may include the computing system identifying the frequency of light output by each light emitter based on the image data, and matching each location from which each frequency of light is output to a light activator known to have supplied that frequency of light.

In another example, mapping the current display location to a light activator may include the computing system identifying the binary light pattern output by each light emitter based on the image data, and matching each location from which each binary light pattern is output to a light activator known to have supplied that binary light pattern. Thus, to accomplish mapping via binary light patterns, a series of binary code images may be displayed via the three-dimensional display. The renderings of these images in the display are captured using the external camera. The captured and projected images are each assigned a binary code based on the binary pattern that was projected. Display locations in the display are mapped to the light activator(s) that have the same binary code. Finally, to render an image in the light field display, the mapping is applied to render a supplied image that will result in the correct image appearing in the display, as described in more detail below.

In a still further example, mapping the current display location to a light activator may include tracking the position of each light emitter over time using optical flow or other suitable tracking mechanism. Further, in the case of partial occlusion (e.g., hands performing a gesture on the display), a dynamic recalibration may be performed only on the portion of the display that was occluded once the gesture is complete and the display is not occluded (or another portion of the display is now occluded). Additionally or alternatively, various combinations of the above mapping techniques, or other suitable mechanism for determining which location of the display area is currently being provided light by which light activator, may be utilized.

At 810, method 800 includes driving each light activator to activate a corresponding light emitter to output a three-dimensional image based on the mapping. The output image may be any image indicated by the computing system to be displayed. The image that the computing system desires to be output to a viewer may not correspond to the actual image output by the light activators due to the different locations of the light emitters. Using the light emitter and base/light supplier locations illustrated in FIG. 6A and 6B as an example, a desired image may include a circle of red light positioned in the image at a location that includes light-receiving end (x,y,z) locations of (3,0,4) and (3,0,5) (e.g., the light-receiving end locations for fibers 10 and 14). However, given that the fiber light emitter locations do not directly correspond to the base locations, instead of driving light suppliers coupled to fibers 10 and 14, the light suppliers coupled to fibers 6 and 10 are instead driven.

The light output by the light emitters may be adjusted as the mapping routine is updated. For example, each time the mapping routine is performed, the light output by the light emitters may be adjusted to maintain the desired image, even if the displayed image does not change.

Returning to FIG. 8, method 800 includes tracking an input implement, such as a user's finger(s), and/or object(s) such as a pen, and/or any other suitable touch implement(s), with a camera at 812. The tracking camera may be the same camera used to locate each light emitter, or it may be a separate camera, such as tracking camera 208 of FIG. 2. In one example, the tracking camera may collect depth information usable by the computing system to determine the position in three dimensions of the touch implement. Further, some depth sensors may be able to see the fingers, hands, etc., through the fiber optics which allows detecting movement and gestures inside the display.

At 814, method 800 includes determining if the implement meets a predetermined condition based on the received image data from the tracking camera. The predetermined condition may include the implement coming within a threshold distance of the light emitters. The threshold distance may be in direct contact with the light emitters, or it may be a small distance above the light emitters such that hover gestures may be performed. In another example, the predetermined condition may include the implement (e.g., a user's hand) performing a gesture, which may include the implement moving at a predefined speed and/or trajectory.

While the above example includes an implement coming within a threshold distance of the light emitters, it is to be understood that multiple implements and/or other predetermined conditions are within the scope of this disclosure. For example, more than one implement may be used to enter input, such as two or more fingers and/or hands and/or objects. This may include multiple types of implements used together, such as a finger and a stylus. Further, the predetermined condition may include the implement(s) being in different states (e.g., a gesture where one implement hovers and another implement touches the light emitters at the same time).

If the implement does not meet the predetermined condition, method 800 returns. If the implement does meet the predetermined condition, for example if the implement comes within the threshold distance of one or more of the emitters, method 800 proceeds to 816 to adjust the output image based on the location(s) of the touch and/or hover. For example, in the vicinity of where the implement contacts the light emitters, the light emitters may be driven to output light and/or adjust a color of light output to provide a visual indicator of the touch contact. In another example where the light emitters are provided in multiple, discrete layers, touch input may be used to control which layer or layers emits light and/or what is displayed on each layer. For example, a default configuration may include the top layer of light emitters being activated (e.g., illuminated). When a particular touch input is received, for example if a user "opens" the top layer with his or her hands to reveal a lower layer, the lower layer may then be illuminated and the top layer may be deactivated. In one example, a user may perform the gesture to "open" the top layer using one finger on each hand, and as a result a first layer of data may be displayed on an underlying layer of the display. If the user performs the "open" gesture with two fingers or with a different finger on each hand, a second, more detailed layer of data may be displayed on an underlying layer of the display.

Alternatively and/or additionally, the touch input may provide an indication to the computing system to perform suitable processing, such as selecting an item or other action typically associated with user touch input. Further, in addition or alternative to using depth information to track the touch implement, each light emitter may have a touch sensor to detect contact by a touch implement, such as capacitive sensors, stress gauges, motion sensors, or other suitable touch-detection mechanisms located on the light emitter tips or other location.

In a still further example, touch input may be detected via display light output by the light emitters being reflected back to the light-receiving ends by the touch implement. For example, a camera may be pointed at the light-receiving ends of the fibers. One or more mirrors may be positioned at the bottom of the fibers, such as one that reflects the laser projector image and another that reflects the bottoms of the fibers into a camera. The camera could use visible or IR light to detect changes in the light reflected back to the bottom of the fibers. That light would change depending on which fibers are touched and where, and the system could learn the touch positions based on the changes in the images captured by the camera.

The above approach may be combined with other approaches such as depth sensing. For example, depth sensing could be used to obtain more information about the hands at the time of the touch, such as when the hands are opening the display to see the layer(s) underneath (e.g., whether the index and middle finger touching each other at the time of the contact with the fibers) to have larger set of possible gestures and experiences.

At 818, method 800 includes adjusting the mapping as the emitter locations change. For example, if the touch contact causes any of the light emitters to change locations, an update to the mapping may be performed.

Thus, method 800 described above provides for determining a location in three-dimensional space of each of a plurality of light emitters and mapping a light activator to a respective emitter location. An image, video, and/or animation to be displayed by the display may be adjusted based on the mapping, even as the emitter locations change. Further, in response to detected touch input, various user interface actions may be performed. In some examples, the entire display itself may be moved, by a motor or other actuator, in order to improve the perceived display density or achieve other benefits. For example, the display may be rotated to simulate the effect of looking from a moving car at something behind a picket fence.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
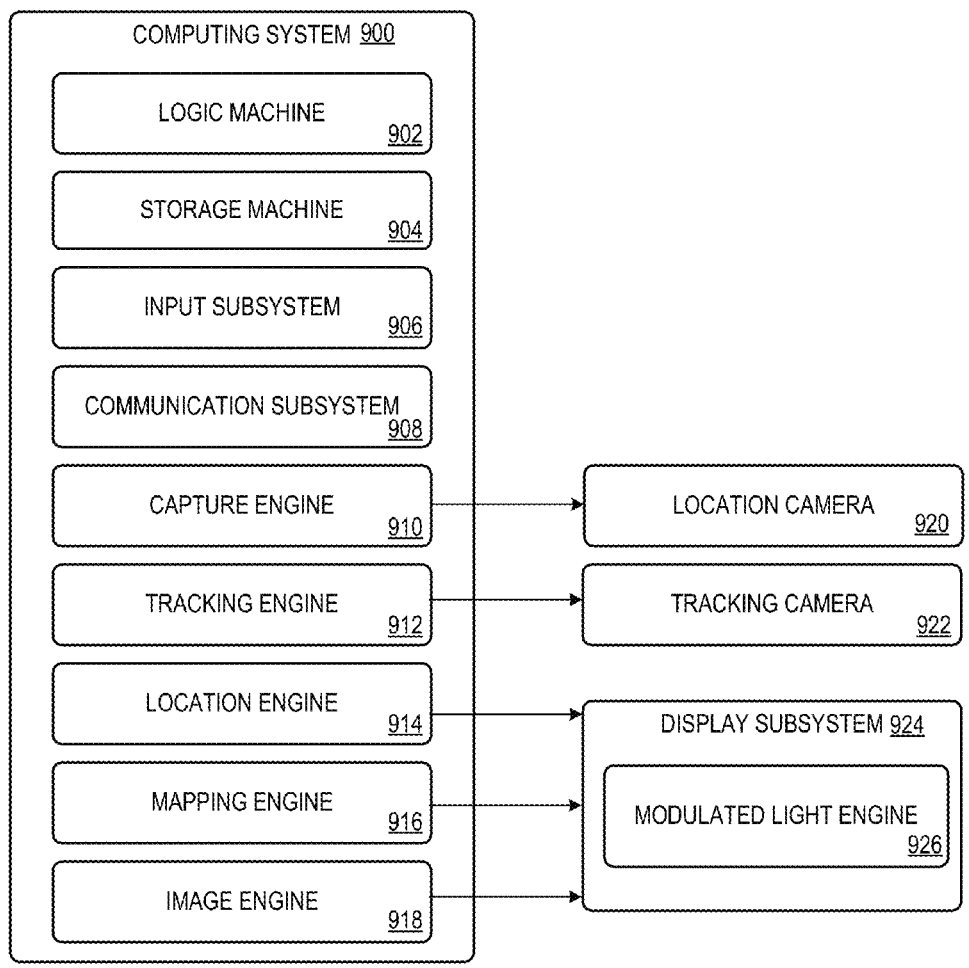
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. Computing system 204 is one non-limiting example of computing system 900.

Computing system 900 includes a logic machine 902 and a storage machine 904. Computing system 900 may optionally include a display subsystem 924, input subsystem 906, communication subsystem 908, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 924 may be used to present a visual representation of data held by storage machine 904. This visual representation may take the form of a graphical user interface (GUI). As the herein described methods and processes change the data held by the storage machine, and thus transform the state of the storage machine, the state of display subsystem 924 may likewise be transformed to visually represent changes in the underlying data. Display subsystem 924 may include a plurality of moveable light emitters and one or more light activators as explained above with respect to FIGS. 1-3. Additionally, the display subsystem 924 may include a modulated light engine 926 to independently drive the light activator(s) (e.g., independently command each light activator to activate or not activate each corresponding light emitter to emit light of a specified color and/or intensity). Such display devices may be combined with logic machine 902 and/or storage machine 904 in a shared enclosure, or such display devices may be peripheral display devices.

When included, input subsystem 906 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for light emitter location mapping, touch implement tracking, machine vision, and/or gesture recognition; a head tracker, eye tracker, accelerometer, and/or gyroscope for motion detection and/or intent recognition; as well as electric-field sensing componentry for assessing brain activity.

When included, communication subsystem 908 may be configured to communicatively couple computing system 900 with one or more other computing devices. Communication subsystem 908 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Computing system 900 may include various engines to execute certain functions described herein. For example, a capture engine 910 may be present to capture location information usable to determine a location in the display space of each of the moveable light emitters. The capture engine 910 may include and/or communicate with a location camera 920 in some examples. In other examples, the capture engine may include depth sensors, motion sensors, or other suitable mechanisms for capturing the location information.

A tracking engine 912 may be present to track a position, shape, and/or orientation of one or more user input implements, such as a hand of a user, a stylus, and/or other objects. By knowing where a hand is located, and identifying a touch event, the content of emitters that do not move and/or that do move may be affected. For example, emitters may become brighter as a hand is approaching them, even if their location is not changed.

The tracking engine 912 may include and/or communicate with a tracking camera 922 in some examples. In other examples, the tracking engine may include depth sensors, touch sensors, or other suitable mechanisms for capturing the tracking information. Further, in some examples the location camera and tracking camera may be the same camera.

A location engine 914 may be present to determine the current display location of each light emitter. The location engine 914 may drive the light activator(s) via the modulated light engine 926 to activate the light emitters to emit location light and the location engine may receive information from the capture engine, for example, in order to determine the current display location of each light emitter. The location engine may be in communication with the display subsystem 924 in order to drive the light activator(s), for example. A mapping engine 916 may be present to map, for each current display location of the display device, the light activator activating the light emitter currently located at that current display location. The mapping engine may receive information from the location engine and be in communication with the display subsystem 924.

An image engine 918 may be present to drive the light activator(s) to activate the light emitters to display a target three-dimensional image based on the mapping. As such, the image engine may receive information from the mapping engine and communicate with the display subsystem 924.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

An example provides a system comprising a plurality of moveable light emitters, each moveable light emitter configured to independently emit a display light from a current display location within that moveable light emitter's range of motion responsive to activation from a corresponding light activator, a location engine to determine, for each light emitter, the current display location of that light emitter, and a mapping engine to map, for each current display location, the light activator activating the light emitter currently located at that current display location. Such an example additionally or alternatively includes where the location engine activates each light activator to drive a corresponding moveable light emitter to emit a uniquely-identifying location light observable by a camera, and where the mapping engine maps the location light observed at each current display location to the respective light activator that drives the corresponding moveable light emitter to emit the observed location light. Such an example additionally or alternatively includes the location light comprising location light of a plurality of frequencies, where each movable light emitter emits a uniquely-identifying frequency of light. Such an example additionally or alternatively includes the location light comprising location light emitted in a time sequential binary pattern, where each movable light emitter emits a uniquely-identifying time sequential binary pattern of light. Such an example additionally or alternatively includes the location light comprising visible light. Such an example additionally or alternatively includes the location light comprising infrared light. Such an example additionally or alternatively further comprises an image engine to drive each light activator to drive a corresponding light emitter to display a target three-dimensional image based on the mapping. Such an example additionally or alternatively includes each moveable light emitter comprising a light-receiving first end to receive the display light and a light-emitting second end to emit the display light, and where each light activator comprises a light supplier, each light supplier configured to supply display light to a respective light-receiving first end of a corresponding moveable light emitter. Such an example additionally or alternatively includes the plurality of different light suppliers collectively comprising a projector, such as a laser projector. Such an example additionally or alternatively includes the plurality of movable light emitters comprising a plurality of optical fibers, where each optical fiber is optically coupled to one of the plurality of different light suppliers at its light-receiving first end. Such an example additionally or alternatively includes the plurality of optical fibers being arranged in one or more optical fiber bundles. Such an example additionally or alternatively includes the plurality of optical fibers comprising optical fibers of a plurality of different lengths randomly distributed in the one or more optical fiber bundles. Such an example additionally or alternatively includes the plurality of optical fibers comprising a first set of optical fibers having a first length and a second set of optical fibers having a second length. Such an example additionally or alternatively further comprises a tracking camera to track a position of a user input implement, and wherein each light activator is configured to adjust activation of a corresponding light emitter to adjust the emitted display light based on the position of the user input implement. Any or all of the above-described examples may be combined in any suitable manner in various implementations.

Another example provides a system comprising a plurality of different light suppliers; a modulated light engine independently driving each of the plurality of different light suppliers to output a display light; for each of the plurality of different light suppliers, a moveable light emitter configured to emit the display light from a current display location within that moveable light emitter's range of motion; a location engine to determine, for each light emitter, the current display location of the light emitter; and a mapping engine to map, for each current display location, the light supplier driving the light emitter at the current display location. Additionally or alternatively, such an example includes the plurality of different light suppliers and the modulated light engine collectively comprising a laser projector, and wherein each moveable light emitter comprises an optical fiber. Additionally or alternatively, such an example further comprises an image engine to drive the laser projector to project a target three-dimensional image based on the mapping. Additionally or alternatively, such an example further comprises a tracking camera to track a position of a user input implement, and wherein the image engine is configured to adjust display light projected by the laser projector based on the position of the user input implement. Any or all of the above-described examples may be combined in any suitable manner in various implementations.

Another example provides for a system comprising a plurality of different light suppliers; a modulated light engine independently driving each of the plurality of different light suppliers to output a display light; for each of the plurality of different light suppliers, a flexible optical fiber optically coupled to the light supplier at a display light-receiving first end and configured to emit the display light from a display light-emitting second end at a current display location within that optical fiber's range of motion; a location engine to determine, for each optical fiber, the current display location of the optical fiber; and a mapping engine to map, for each current display location, the light supplier supplying display light to the optical fiber at the current display location. Additionally or alternatively, such an example further comprises an image engine to drive the modulated light engine and plurality of light suppliers to supply a target three-dimensional image to the optical fibers based on the mapping. Any or all of the above-described examples may be combined in any suitable manner in various implementations.

The invention claimed is:
1. A system, comprising:
   a plurality of moveable light emitters, each moveable light emitter being freely moveable in three dimensions within that moveable light emitter's range of motion, such that each moveable light emitter is configured to independently emit a display light from a plurality of different display locations within that moveable light emitter's range of motion responsive to activation from a corresponding light activator;
   a location engine to determine, for each light emitter, a current display location of that light emitter;
   a mapping engine to map, for each current display location, the light activator activating the light emitter currently located at that current display location; and
   an image engine to dynamically specify the display light for each of the plurality of moveable light emitters as one or more light emitters of the plurality are moved within their ranges of motion, such that the plurality of moveable light emitters collectively display a target image even as the one or more light emitters are moved.
2. The system of claim 1, where the location engine activates each light activator to drive a corresponding moveable light emitter to emit a uniquely-identifying location light observable by a camera, and where the mapping engine maps the location light observed at each current display location to the respective light activator that drives the corresponding moveable light emitter to emit the observed location light.

3. The system of claim 2, wherein the location light comprises location light of a plurality of frequencies, where each movable light emitter emits a uniquely-identifying frequency of light.

4. The system of claim 2, wherein the location light comprises location light emitted in a time sequential binary pattern, where each movable light emitter emits a uniquely-identifying time sequential binary pattern of light.

5. The system of claim 2, wherein the location light comprises visible light.

6. The system of claim 2, wherein the location light comprises infrared light.

7. The system of claim 1, where the target image is a three-dimensional image.

8. The system of claim 1, wherein each moveable light emitter comprises a light-receiving first end to receive the display light and a light-emitting second end to emit the display light, and wherein each light activator comprises a light supplier, each light supplier configured to supply display light to a respective light-receiving first end of a corresponding moveable light emitter.

9. The system of claim 8, wherein a plurality of different light suppliers collectively comprise a projector.

10. The system of claim 1, wherein the plurality of movable light emitters comprises a plurality of optical fibers, and wherein adjacent optical fibers have overlapping ranges of motion.

11. The system of claim 10, wherein the plurality of optical fibers are arranged in one or more optical fiber bundles.

12. The system of claim 11, wherein the plurality of optical fibers comprise optical fibers of a plurality of different lengths randomly distributed in the one or more optical fiber bundles.

13. The system of claim 10, wherein the plurality of optical fibers comprise a first set of optical fibers having a first length and a second set of optical fibers having a second length.

14. The system of claim 1, further comprising a tracking camera to track a position of a user input implement, and wherein each light activator is configured to adjust activation of a corresponding light emitter to adjust the emitted display light based on the position of the user input implement.

15. A system, comprising:
a plurality of different light suppliers;
a modulated light engine independently driving each of the plurality of different light suppliers to output a display light;
for each of the plurality of different light suppliers, a moveable light emitter configured to emit the display light from a plurality of different display locations within that moveable light emitter's range of motion, each moveable light emitter being freely moveable in three dimensions within that moveable light emitter's range of motion;
a location engine to determine, for each light emitter, a current display location of the light emitter;
a mapping engine to map, for each current display location, the light supplier driving the light emitter at the current display location; and
an image engine to dynamically specify the display light for each of the plurality of moveable light emitters as one or more light emitters of the plurality are moved within their ranges of motion, such that the plurality of moveable light emitters collectively display a target image even as the one or more light emitters are moved.

16. The system of claim 15, wherein the plurality of different light suppliers and the modulated light engine collectively comprise a laser projector, and wherein each moveable light emitter comprises an optical fiber.

17. The system of claim 16, where the target image is a three-dimensional image.

18. The system of claim 16, further comprising a tracking camera to track a position of a user input implement, and wherein the image engine is configured to adjust display light projected by the laser projector based on the position of the user input implement.

19. A system, comprising:
a plurality of different light suppliers;
a modulated light engine independently driving each of the plurality of different light suppliers to output a display light;
for each of the plurality of different light suppliers, a flexible optical fiber optically coupled to the light supplier at a display light-receiving first end and configured to emit the display light from a display light-emitting second end at a plurality of different display locations within that optical fiber's range of motion, each optical fiber being freely moveable in three dimensions within that optical fiber's range of motion;
a location engine to determine, for each optical fiber, a current display location of the optical fiber;
a mapping engine to map, for each current display location, the light supplier supplying display light to the optical fiber at the current display location; and
an image engine to dynamically specify the display light for each of the plurality of flexible optical fibers as one or more optical fibers of the plurality are moved within their ranges of motion, such that the plurality of flexible optical fibers collectively display a target image even as the one or more optical fibers are moved.

20. The system of claim 19, where the target image is a three-dimensional image.

* * * * *